United States Patent [19]

Eisenberg

[11] 4,232,299
[45] Nov. 4, 1980

[54] WIRELESS OUTPUT/INPUT SYSTEM

[75] Inventor: Robert M. Eisenberg, Woodbine, Md.

[73] Assignee: The Singer Company, Binghamton, N.Y.

[21] Appl. No.: 930,356

[22] Filed: Aug. 2, 1978

[51] Int. Cl.³ ............................................. H04Q 9/12
[52] U.S. Cl. ......................... 340/171 R; 340/152 R; 340/365 R; 375/9
[58] Field of Search .................. 340/150–152, 340/365 R, 365 S, 171PF, 171 R, 310 R; 325/111, 64, 37; 343/225

[56] References Cited

U.S. PATENT DOCUMENTS

| | | | |
|---|---|---|---|
| 3,766,523 | 10/1973 | Brocker et al. | 325/64 X |
| 3,824,465 | 7/1974 | Blough | 325/111 X |
| 3,846,783 | 11/1974 | Apsell et al. | 325/64 X |
| 4,005,388 | 1/1977 | Morley et al. | 340/365 R |
| 4,005,428 | 1/1977 | Graham | 325/64 X |
| 4,053,717 | 10/1977 | Snider | 325/64 X |
| 4,072,825 | 2/1978 | McLay et al. | 340/310 X |
| 4,087,638 | 5/1978 | Hayes et al. | 340/365 S |
| 4,092,599 | 5/1978 | Yee et al. | 325/64 X |

OTHER PUBLICATIONS

Motorola RDS 1000 Control Unit Brochure.

Primary Examiner—Donald J. Yusko
Attorney, Agent, or Firm—Douglas M. Clarkson; Ronald Reichman; Jeffrey Rothenberg

[57] ABSTRACT

A system for entering information into an electronic system from some remote location and displaying certain information that is produced by the electronic system at a remote location. The apparatus of this invention is a portable, hand/held, compact device that may be used for entering information into a digital computer and displaying information that is output by the computer without any wires being interconnected between the portable device and the computer.

19 Claims, 5 Drawing Figures

WIRELESS OUTPUT/INPUT SYSTEM

BACKGROUND OF THE INVENTION

1. Field of the Invention

This invention relates to electronic circuits and more particularly to portable devices for entering information into a digital computer.

2. Description of the Prior Art

Man has invented simulators and other training devices to teach students how to use and operate various types of equipment without undergoing the dangers that are inherent in the equipments' actual operation. For instance, it is a great deal safer to learn how to fly an aircraft on the ground in a simulator than in an actual airplane in the air. It is also a great deal safer to learn how to operate power plants, chemical process plants, etc. in a simulator than in the actual plants.

Simulators streamline and cut the costs of training by permitting more intensive training time by permitting an instructor to control the various conditions that exist in the system being simulated. The instructor may enter parameters into the simulated system to duplicate some abnormal condition that might exist in the system being simulated. The instructor observes, rates and monitors the student's performance in handling this abnormal condition. If the student makes a mistake no one is hurt and no damage is done to any property. At this time the instructor may freeze all of the simulated systems conditions to permit the student to study them and then resume simulation activities at the point of interruption. The instructor may repeat the same malfunction until the student learns how to use the proper instruments and controls without making a mistake. Thus, an instructor can observe a pilot making an emergency landing or a nuclear power plant operator shutting a nuclear power plant down during emergency conditions.

Simulation is accomplished by creating realistic replicas or using the actual equipment of the device being simulated. These replicas or actual equipment are linked to an interface which is coupled to a digital computer. The computer solves equations that actuate the controls and instrumentation of the device being simulated so that the student will experience the same sensations that would occur in the actual operation of the device with similar manipulation of its controls.

In order to permit an instructor to observe the students progress and control what is being simulated an instructors station is coupled to the digital computer. The instructors station may consist of: a master terminal keyboard that allows the instructor to communicate with the computer so that he may make changes in the simulated systems operation or enter malfunctions into the simulated system; a teleprinter that provides a hard copy printout of all simulated operations to permit the student and instructor to evaluate the students progress; and a plurality of multifunction cathode ray tube displays that are used to monitor the students performance and display information about the computer and system being simulated. Operation of the simulator is controlled from the instructors station. Thus, in the systems used in the prior art the instructor could not be next to the student while he changed what was being simulated or communicated with the computer.

SUMMARY OF THE INVENTION

This invention overcomes the disadvantages of the prior art by providing a compact portable device that is not hard wired to a digital computer and may be used for inputting information to the computer and causing the computer to perform some function like displaying its response to the entered inputs at some remote location. The apparatus of this invention is a portable, hand held input/readout device that may be used by an operator or instructor to interface with a computer or training device such as a flight/tactics or power plant simulator. This invention may be used to replace the instructor's station. This invention may also be used by a computer operator while he is not next to the computer. For instance, the operator may be taking an inventory of goods in a warehouse while entering information into a computer that is located in the next room.

Present day simulators and instructor's stations are rather large devices. Certain types of simulators are the same size as the device being simulated. For instance, when the control room of a power plant is simulated, the actual panels, meters, gauges and instruments that are found in the power plant's control room are used in the simulator. If only an instructor's station were used, the instructor would not be able to perform "over the shoulder" instruction and observe the student while modifying the training environment by entering parameters such as malfunctions into the simulation program and visually observe the student's responses to such changes. However, if this invention is used the instructor may walk around the simulator and perform "over the shoulder" instruction while the instructor enters information into and reads information out of the simulation computer.

It is an object of this invention to provide a new and improved portable device for entering information into and reading information out of electronic devices.

It is another object of this invention to provide a new and improved portable device for entering information into and reading information out of computers.

It is another object of this invention to provide a new and improved portable device for entering information into and reading information out of simulators.

Further objects and advantages of this invention will become more apparent as the following description proceeds, which description should be considered together with the accompanying drawings.

BRIEF DESCRIPTION OF THE DRAWINGS

FIG. 2 is a matrix showing how FIGS. 2A and 2B are assembled to form a complete drawing.

DESCRIPTION OF A PREFERRED EMBODIMENT

Figure 1:
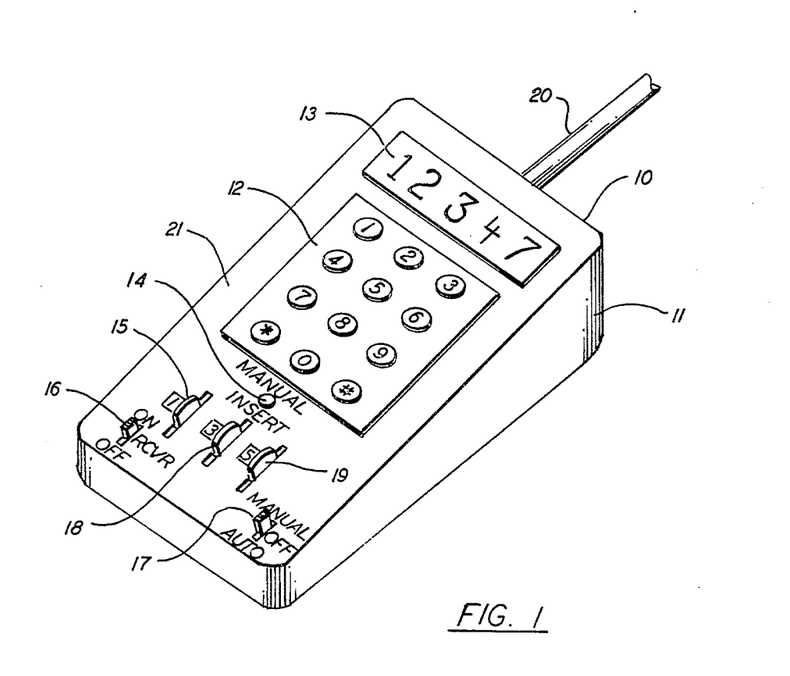
FIG. 1 is a perspective representation of the housing that contains the electronic circuits of the portable, hand held input/readout device of this invention.

Referring now to the drawings in detail, and more particularly to FIG. 1 the reference character 11 represents a housing that contains therein the electronic circuits of the portable, hand held input/readout device 10 of this invention. Keyboard 12, LED displays 13, manual insert switch 14, thumbwheel switches 15, 18 and 19, receiver switch 16 and mode control switch 17 are attached to top panel 21 of housing 11. Antenna 20 is connected to one of the side panels of housing 11. Housing 11 and its electronic contents are small in size and light in weight so that the invention of this disclosure may be carried in a persons hand. Thus, this invention is a portable output/input device that may be transported from place to place with little difficulty and used to enter information into computer systems and receive information from computer systems.

When the instructor wishes to receive information from the computer he throws receiver switch 16 to the "on" position. If the instructor wishes to transmit information to the computer he moves mode control switch 17 either to the manual or AUTO (automatic) position from the center "off" position. If switch 17 was placed in the manual position the instructor may enter information into the computer by depressing the # key on keyboard 12; depressing the keys on keyboard 12 that correspond to the information the instructor wishes to be transmitted to the computer; and pushing manual insert switch 14, whereby the selected information is transmitted to the computer. After the computer receives the selected information it may decide to transmit information back to the apparatus of this invention which will be displayed on display 13. In the event that the instructor desires to automatically enter information into the computer he: moves mode control switch 17 to the AUTO position; sets thumbwheel switches 15, 18 and 19 to the information he desires to enter into the computer; and presses the # key on keyboard 12, whereby the information selected by the instructor is transmitted to the computer. After receiving the transmitted information the computer may decide to transmit the information back to this invention and permit certain information to be displayed on displays 13.

Figure 2:
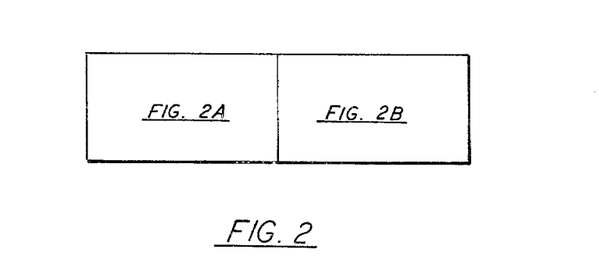
Figure 2A:
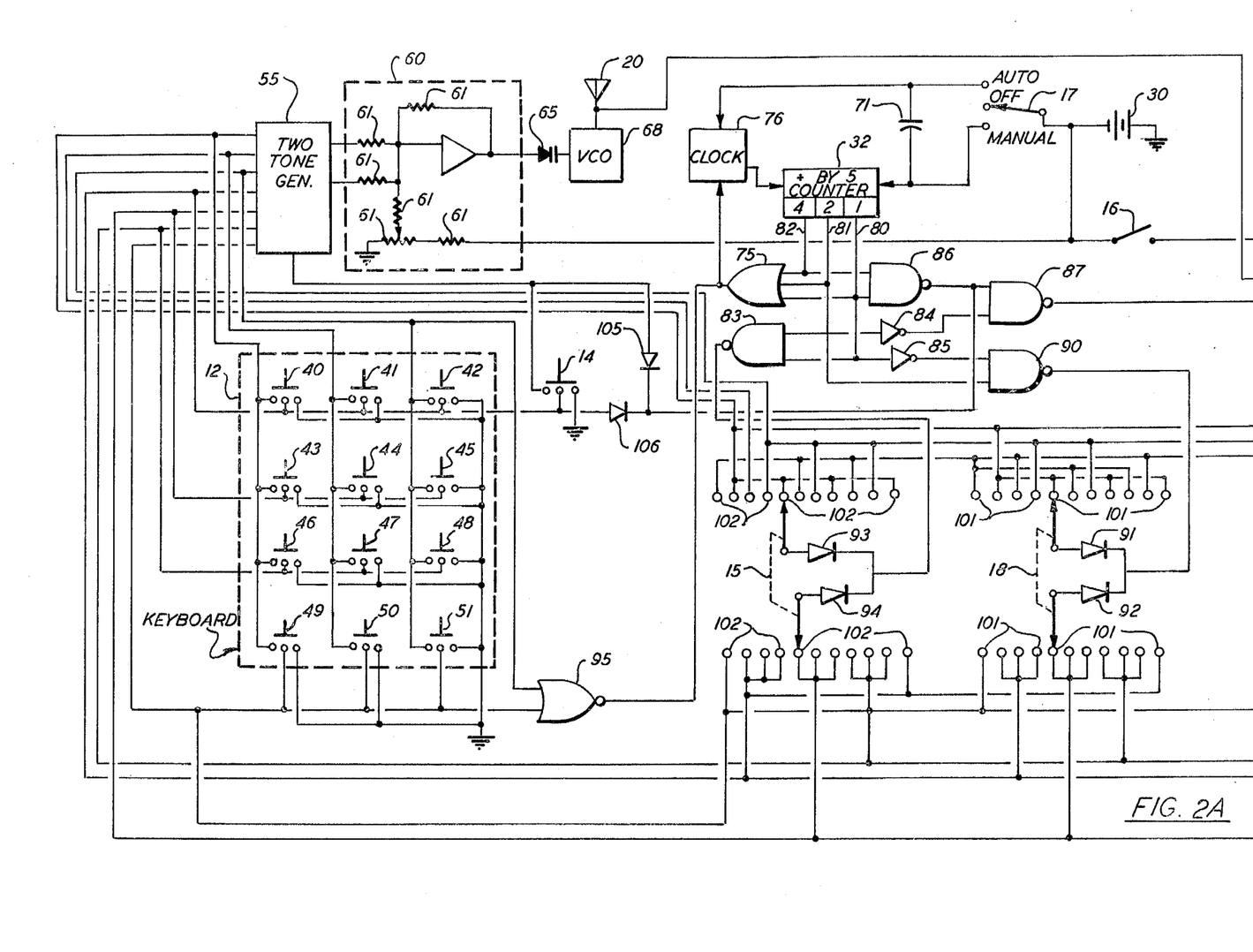
FIGS. 2A and 2B are logic diagrams of the electronic system that comprises the portable, hand held input/readout device of FIG. 1.
Figure 2B:
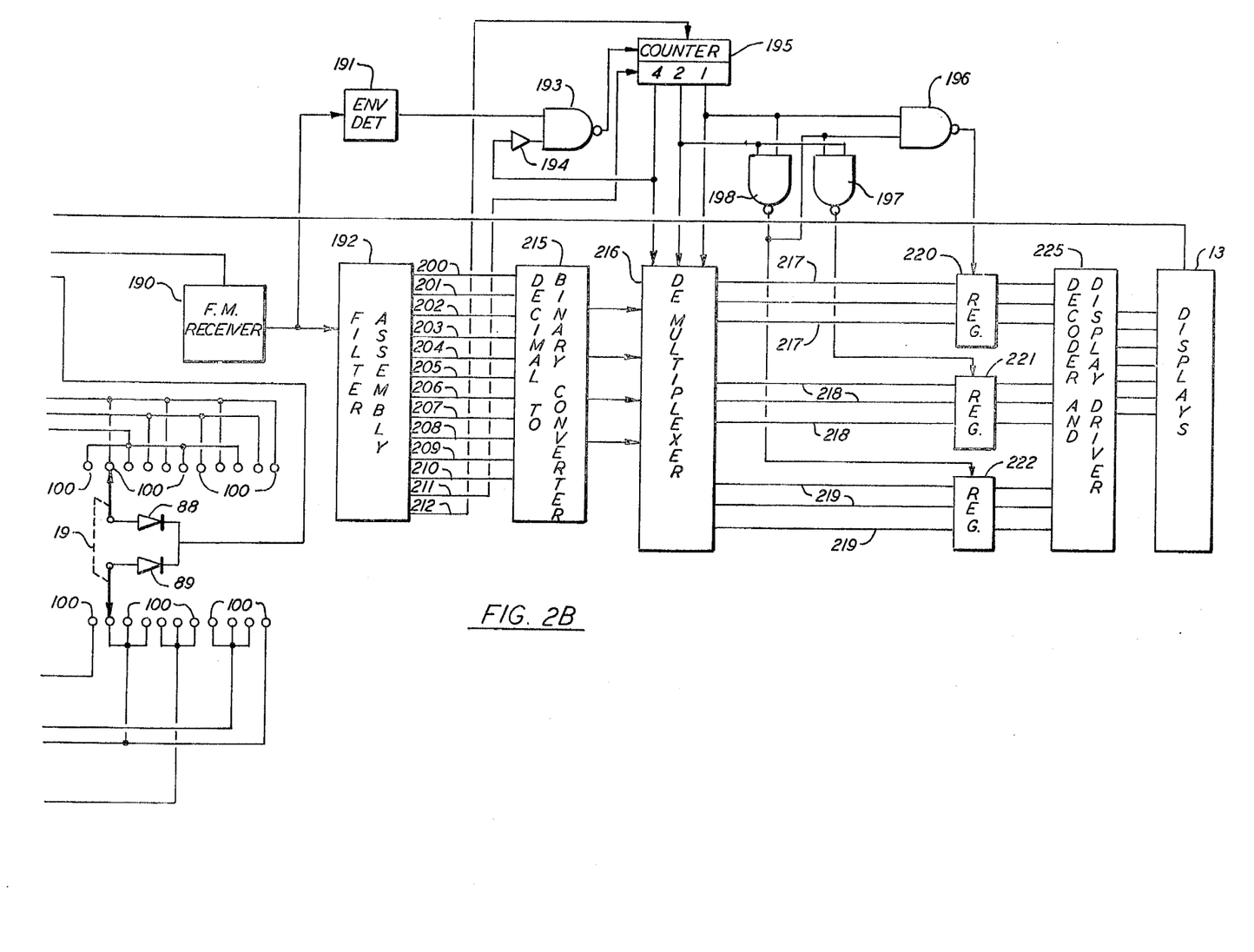

The details of construction of the electronic circuits that comprise the portable, hand held input/readout device 10 are shown in FIGS. 2A and 2B. Activation of this device is accomplished by moving the armature of mode control switch 17 FIG. 2A to either the manual or the automatic positions from the center "off" position. When switch 17 is moved to the manual position a voltage from battery 30 is applied to divide by five counter 32. Information may now only be entered into this device by means of keyboard 12. A different key is used for entering different information. A one is entered by depressing key 40, and a two is entered by pressing key 41. Key 42 is used for entering the number 3 and key 43 is used for entering the number 4. The number 5 is entered by pressing key 44 and the number 6 is entered by pressing key 45. A 7 may be entered by depressing the key 46 and an 8 may be entered by depressing key 47. Key 48 is used for entering the number 9 and key 49 is used for entering an *. A zero is entered by pressing key 50 and the symbol # is entered by pressing key 51. Pressing any one of the keys 40-51 simultaneously provides two grounds to two tone generator 55. When the instructor decides to transmit to the computer the information that was selected by pressing keys 40 through 51, he depresses manual insert key 14. The pressing of key 14 causes two tone generator 55 to transmit tones that will be received by the computer (FIG. 3) hereinafter described which will inform the computer that all information has been transmitted. Two tone generator 55 has seven other inputs that are arranged as a 4×3 matrix with four columns and three rows. The first column is 1, 4, 7, *; the second column is 2, 5, 8, 0 and the third column is 3, 6, 9, #. Thus the pressing of any key 40-51 will provide to the two tone generator 55 matrix a ground on a column input terminal and also on a row column thereby defining the particular key that was depressed. Each column input causes a unique tone to be generated as does each row input. Seven different tones are therefore all that are required to specify any one of the 12 key selections. The audio frequencies or tones generated and outputted by two tone generator 55 are coupled to the two inputs of operational amplifier 60. Resistors 61 are used to properly bias amplifier 60. Amplifier 60 has two outputs one of which is coupled to the cathode input of varicap diode 65. The second output of amplifier 60 is connected to mode switch 17 and battery 30. Amplifier 60 is used for converting the audio frequencies generated by two tone generator 55 into voltages, and diode 65 changes the capacitive reactance when the applied voltage varies. The output of diode 65 is connected to a Voltage Controlled Oscillator 68, that operates in the radio frequency spectrum, and the output of oscillator 68 is coupled to antenna 20. Antenna 20 produces a radiated radio frequency output which is modulated in frequency at a rate and amplitude proportional to the two tones generated by generator 55. As previously stated, the tones generated by generator 55 are dependent upon which one of keys 14, 40-51 were depressed.

The radio frequency modulated (F.M.) signal output of antenna 20 is received by a receiver 126 (FIG. 3) that interfaces with the computer. The F.M. receiver 126 detects the transmitted tones, decodes them and provides the transmitted numerical data in binary coded format for conventional inputting to the computer. The operation of the computer receiver/decoder will be described in the description of FIG. 3.

When mode control switch 17 is moved to the automatic position, clock 76 begins to run and a voltage from battery 30 passes through capacitor 71 and causes divide by five counter 32 to be set to zero. The output of clock 76 is connected to the input of divide by five counter 32. Counter 32 has three outputs (1, 2, and 4) that are respectively transmitted on lines 80, 81 and 82. The three bit outputs of counter 32 are coupled to the inputs of or gate 75 via lines 80, 81 and 82. The output of or gate 75 is coupled to the input of clock 76 and is used as a controlling voltage for clock 76. Thus, if counter 32 has an output or gate 75 and clock 76 will be enabled. Conversely if counter 32 has no output clock 76 will be disabled.

Lines 80 and 81 are coupled to the inputs of nand gate 83 and line 80 is coupled to the input of inverter 85. Line 81 is coupled to the input of inverter 84. The two inputs to nand gate 86 are lines 80 and 82. The output of nand gate 86 is coupled to one of the two inputs of nand gate 87 and to one of the contacts of thumb wheel switch 15. The second input to gate 87 is coupled to the output of inverter 84 and the output of gate 87 is coupled to the outputs of isolating diodes 88 and 89. The input of diode 88 is coupled to one of switch contacts 100 and the input of diode 89 is connected to one of switch contacts 100. Nand gate 40 has two inputs: line 81; and the output of inverter 85. The output of nand gate 90 is coupled to the inputs of isolating diodes 91 and 92. The input of 91 is coupled to one of switch contacts 101 and the input of diode 92 is coupled to one of switch contacts 101. Isolating diodes 93 and 94 outputs are connected to the output of gate 83 and the inputs of diodes 93 and 94 are connected to switch contacts 102. Contacts 102 are connected to switch 15 and contacts 101 are connected to switch 18. Contacts 100 are connected to switch 19 and contacts 100, 101 and 102 are connected to the inputs of two tone generator 55.

Gates 83, 86, 87 and 90 and inverters 84 and 85 perform the function of supplying a low (ground) to contacts 100, 101 and 102 through isolating diodes 88, 89, 91, 92, 93 and 94 in a sequence that is determined by the sequencing of counter 32. When counter 32 is set to zero the sequence begins. The pressing of the # symbol key 51 causes a control voltage high to enable nor gate 95. The output of gate 95 is coupled to the control input of clock 76. At the moment clock 76 receives the control input signal, clock 76 begins to output a series of pulses to counter 32. As soon as counter 32 begins incrementing, the control voltage for clock 76 is obtained from the output of or gate 75 and it is no longer necessary to depress # key 51. Thus, when the counter 32 has a count of one it indicates that # key 51 was depressed and data will be transmitted. When counter 32 has a count of two the number selected by switch 15 will be sampled and when counter 32 has a count of three the number selected by switch 18 will be sampled. When counter 32 has a count of four the number selected by switch 19 will be sampled. At the moment counter 32 reaches a count of 5, nand gate 86 is enabled and a signal is transmitted to two tone generator 55 via diodes 105 and 106. Diodes 105 and 106 automatically perform the same function in the automatic mode as did manual insert switch 14 (hereinbefore described) in the manual mode. The signal transmitted to generator 55 is the insert tone combination that will be transmitted via amplifier 60, varicap diode 65, voltage controlled oscillator 68 and antenna 70 to the receiver module (hereinafter described) that is coupled to the computer. The numerical data set on thumb wheel switches 15, 18 and 19 is now available for inputting to the computer 180 (which will be described in the description of FIG. 3).

Figure 3:
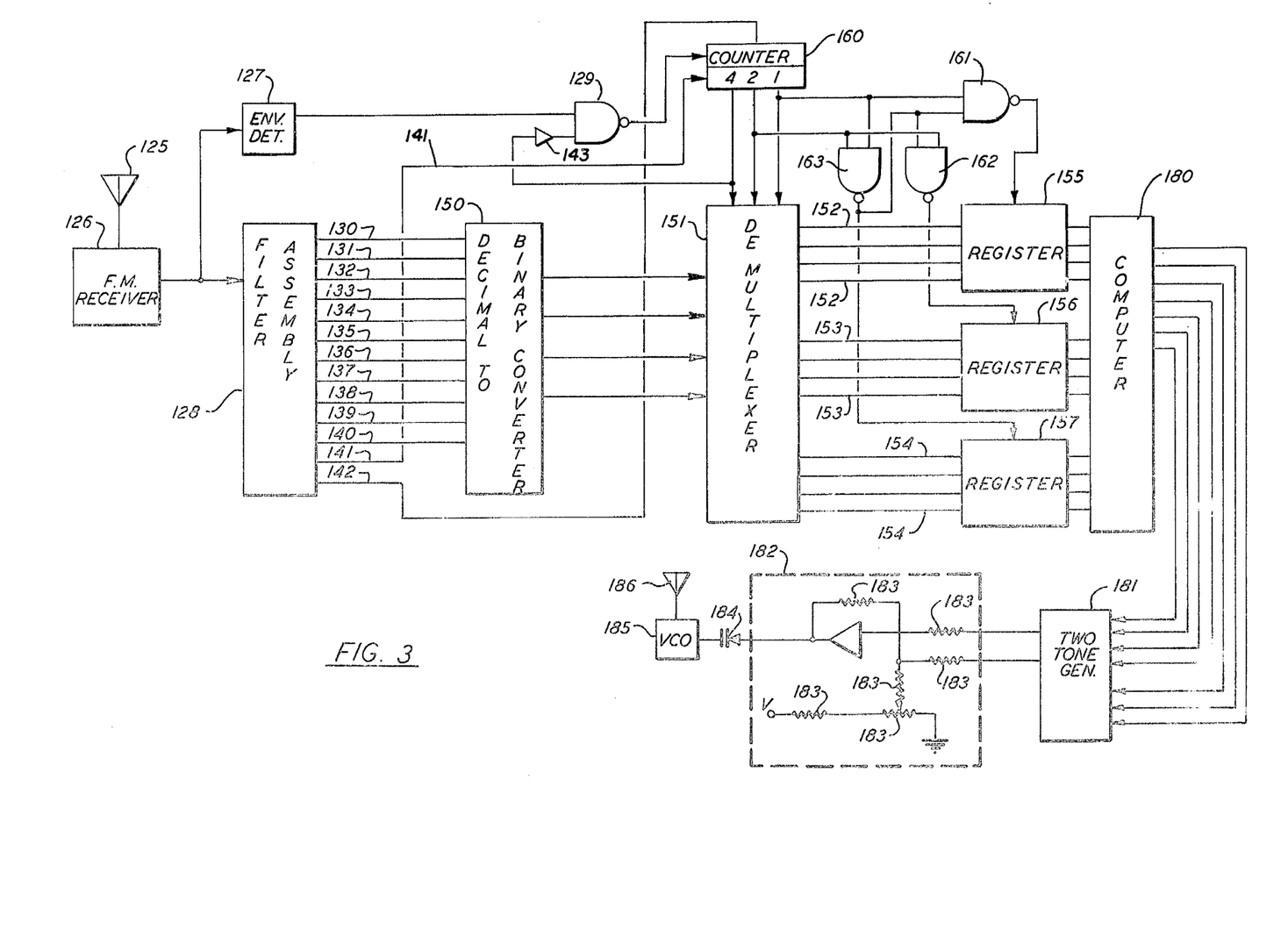
FIG. 3 is a logic diagram of a receiving and transmitting system that is used to couple the portable hand held device of FIGS. 2A and 2B to a computer system.

When the instructor closes receiver switch 16, power will be supplied to LED displays 13 (FIG. 2B) and the receiver portion of portable hand held input readout device 10 (shown in FIG. 2B) will be ready to receive and display the information transmitted by computer 180 (FIG. 3).

The frequency modulated radio signals that are transmitted by oscillator 185 and antenna 186 (described in the description of FIG. 3) are received and detected by antenna 20 (FIG. 2A) and F.M. Receiver 190 (FIG. 2B). F.M. receiver 190 outputs in parallel the detected audio envelope to envelope detector 191 and filter assembly 192. Envelope detector 191 rectifies the tone burst received from receiver 190 and generates an output signal which is a pulse for each tone burst. These pulses are coupled to one of the two inputs of nand gate 193. The second input to nand gate 193 is the output of inverter 194. The input of inverter 194 is coupled to the counter 195 count of four signal. When nand gate 193 is enabled counter 195 will be incremented by a count of one when the pulses produced by envelope detector 191 arrive. The foregoing will only happen when envelope detector 191 outputs less than five pulses and reset line 212 is not active. The audio tone envelopes that are inputted to filter assembly 192 by receiver 190 are selectively decoded by the filters contained within the filter assembly and appears on the eleven output terminals 200-212 of filter assembly 192 as a voltage level of 5 volts corresponding to the instantaneous input tone combination. Lines 200-210 are connected to decimal to binary converter 215. The following information is transmitted on the following lines: zero on line 200; one on line 201; two on line 202; three on line 203; four on line 204; five on line 205; six on line 206; seven on line 207; eight on line 208; nine on line 209; and * on line 210. Converter 215 changes its decimal input signal into a binary code output format. Binary to decimal converter 215 has a four bit output that is routed to the input terminals of de-multiplexer 216. De-multiplexer 216 is coupled to the outputs of counter 195. The two inputs of nand gate 196 are the output of nand gate 198 and the counter 195 count of one signal and the two inputs of nand gate 197 are the output of nand gate 198 and the counter 195 count of two signal. The output of gate 196 is connected to the load input of register 220, and the output of gate 197 is connected to the load input of register 221. The inputs to nand gate 198 are the count of three signal produced by counter 195 (the count of two line and the count of one line) and the output of gate 198 is connected to the load input of register 222. Counter 195 is used for the addressing of de-multiplexer 216 to permit de-multiplexer 216 to control the routing of its four line binary input to one of three sets of four line outputs (lines 217, 218 and 219). Lines 217 are connected to the inputs of holding register 220. Lines 218 are connected to the inputs of holding register 221. Lines 219 are connected to the inputs of holding register 222. When de-multiplexer 216 has input address of 1 (received from counter 195) nand gate 196 will be enabled and the information received from converter 215 will be transmitted to the inputs of holding register 220 via lines 217 and when de-multiplexer 216 has an input address of two nand gate 197 will be enabled and the information received from converter 215 will be transmitted via lines 218 to the inputs of holding register 221. If de-multiplexer 216 has an input address of three, nand gate 198 will be enabled and the information received from converter 215 will be transmitted via lines 219 to the inputs of holding register 222. Counter 195 is reset when it receives the # symbol from filter assembly 192 via line 211. When counter 195 receives its first pulse from envelope detector 191 counter 195 will have a count of one; the second pulse will cause counter 195 to have a count of two; and the third pulse will cause counter 195 to have a count of three. After de-multiplexer 216 has received the address count of three from counter 195, the three digit data received from converter 215 will be transmitted to the inputs of holding register 220, 221 and 222. The outputs of registers 220, 221 and 222 are connected to the inputs of decoder and display driver 225. Decoder 225 decodes its binary input and produces a decimal output that is coupled to and drives LED displays 13. Displays 13 display the information that was received from computer 180 (FIG. 3).

The details of construction of the interface unit that couples the portable hand held device 10 of this invention to a computer system are shown in FIG. 3. The frequency modulated radio signals that are transmitted by oscillator 68 and antenna 70 (described in FIG. 2A) are received and detected by antenna 125 and F.M. receiver 126. F.M. receiver 126 outputs in parallel the detected audio envelope to envelope detector 127 and filter assembly 128. Envelope detector 127 rectifies the tone burst received from receiver 126 and generates an output signal which is a pulse for each tone burst. These pulses are coupled to one of the two inputs of nand gate 129. The second input to nand gate 129 is the output of inverter 181. The input of inverter 181 is coupled to the counter 160 count of four signal.

When nand gate 129 is enabled counter 160 will be incremented by a count of one when the pulses produced by envelope detector 127 arrive. The foregoing will only happen when envelope detector 127 outputs less than five pulses and reset line 141 is not active. The audio tone envelopes that are inputted to filter assembly 128 by receiver 126 are selectively decoded by the filters contained within the filter assembly and appear on the eleven output terminals 130–142 of filter assembly 128 as a voltage level of 5 volts corresponding to the instantaneous input tone combination. Lines 130–140 are connected to decimal to binary converter 150. The following information is transmitted on the following lines: zero on line 130; one on line 131; two on line 132; three on line 133; four on line 134; five on line 135; six on line 136; seven on line 137; eight on line 138; nine on line 139 and * on line 140. Converter 150 changes its decimal input signal into a binary code output format. Binary to decimal converter 150 has a four bit output that is routed to the input terminals of de-multiplexer 151. De-multiplexer 151 is coupled to the outputs of counter 160. The two inputs of nand gate 161 are the output of nand gate 163 and the counter 160 count of one signal, and the two inputs of nand gate 162 are the output of nand gate 163 and the counter 160 count of two signal. The output of gate 161 is connected to the load input of register 155 and the output of gate 162 is connected to the load input of register 156. The inputs to nand gate 163 are the count of three signal produced by counter 160 and the output of gate 163 is connected to the load input of register 157. Counter 160 is used for the addressing of de-multiplexer 151 to permit de-multiplexer 151 to control the routing of its four line binary input to one of three sets of four line outputs (lines 152, 153 and 154). Lines 152 are connected to the inputs of holding register 155 and lines 153 are connected to the inputs of holding register 156. Lines 154 are connected to the inputs of holding register 157. When de-multiplexer 151 has an input address of 1 (received from counter 160) nand gate 161 will be enabled and the information received from converter 150 will be transmitted to holding register 155 via lines 152 and when de-multiplexer 151 has an input address of 2 nand gate 162 will be enabled and the information received from converter 150 will be transmitted via lines 153 to holding register 156. If de-multiplexer 151 has an input address of 3, nand gate 163 will be enabled and the information received from converter 150 will be transmitted via lines 154 to the inputs of holding register 157. Counter 160 is reset when it receives the # symbol from filter assembly 128 via line 141. When counter 160 receives its first pulse from envelope detector 127 counter 160 will have a count of one; the second pulse will cause counter 160 to have a count of two; and the third pulse will cause counter 160 to have a count of three. After de-multiplexer 151 has received the address count of three from counter 160, the three digit data received from converter 150 will be transmitted to the inputs of holding registers 155, 156 and 157. The outputs of registers 155, 156 and 157 are connected to the input of computer 180. Computer 180 looks at registers 155, 156 and 157 in the same manner as it looks at conventional switches. Thus, once information is entered into registers 155, 156 or 157 it will be inputted to computer 180.

When computer 180 and the instructor wishes information to be transmitted to the portable hand held input/readout device 10, the instructor closes switch 16 (FIG. 2A) to enable the receiving portion of device 10 so that it may receive the information transmitted by computer 180. Computer 180 has seven outputs that are coupled to the inputs of two tone generator 181. The inputs to two tone generator 181 are arranged in a 4×3 matrix with four columns and three rows (same as two tone generator 55 of FIG. 2A). The first column is 1, 4, 7, *; the second column is 2, 5, 8, 0 and the third column is 3, 6, 9, #. Thus, the number or symbol outputted by computer 180 will be provided to two tone generator 181 as a ground on a column input terminal and as a ground on a row input column terminal, thereby defining the particular number or symbol outputted by computer 180. Each column input causes a unique tone to be generated as does each row input. Seven different tones are therefore all that are required to specify any of the transmitted numbers or symbols. The audio frequencies or tones generated and outputted by two tone generator 181 are coupled to the two inputs of operational amplifier 182. Resistors 183 are used to properly bias amplifier 182. Amplifier 182 has two outputs one of which is coupled to the cathode input of varicap diode 184. The second output of amplifier 182 is connected to a power source. Amplifier 182 is used for converting the audio frequencies generated by two tone generator 181 into voltages and diode 184 changes the capacitive reactance when the applied voltages varies. The output of diode 184 is connected to a voltage controlled oscillator 185, that operates in the radio frequency spectrum, and the output of oscillator 185 is coupled to antenna 186. Antenna 186 produces a radiated radio frequency output which is modulated in frequency at a rate and amplitude proportional to the two tones generated by generator 181. As previously stated the tones generated by generator 181 are dependent upon which one of the numbers or symbols were selected by computer 180.

The radio frequency modulated (F.M.) signal output of antenna 186 is received by an F.M. receiver 190 (FIG. 2B). The F.M. receiver 126 detects the transmitted tones, decodes them and provides the transmitted numerical data that will be displayed on displays 13. The operation of the receiving/displaying portion of device 10 is described in the description of FIG. 2B.

The above specification describes a new and improved portable system for entering information into a computer. It is realized that the above description may indicate to those skilled in the art additional ways in which the principles of this invention may be used without departing from its spirit. It is, therefore, intended that this invention be limited by the scope of the appended claims.

What is claimed is:

1. A remote controlled wireless transmitter receiver system for entering, and verifying control information or instructions and data into a general purpose electronic computing device, said remote controlled wireless transmitter receiver system comprising:
   a portable hand held housing,
   means connected to said housing for manually entering information, instructions and data,
   a multi tone generator whose inputs are coupled to said entering means, said multi tone generator outputs different frequencies for different information that it receives,
   amplifying means for amplifying and converting the frequency output of said multi tone generator into voltages, the input of said amplifying means being coupled to the output of said tone generator, transmitter means whose input is coupled to the output of said amplifying means for producing and transmitting a radiated radio frequency output which is modulated in frequency at a rate and amplitude proportional to the voltage produced by said amplifying means, means for supplying power coupled to said entering means, said multi tone generator, amplifying means and said transmitter means, receiver means within said housing for receiving radio frequency information transmitted by said general purpose electronic computer device, decoding means for decoding and converting the output of said receiver means, the input of said decoding means being coupled to the output of said receiver means, a plurality of registers for temporarily storing the information produced by said decoding means, the input of said registers being connected to the output of said decoding means, and the output of said registers being coupled to the input of means to verify said information, and timing means whose input is coupled to the output of said receiver means and whose output is coupled to the load input of said registers, whereby said registers are able at the proper times to receive and to transmit said entered control information or instructions and data to said electronic computing device.

2. The system claimed in claim 1 wherein said general purpose electronic device is a programmable digital computer.

3. The system claimed in claim 1 wherein said means for manually entering is a keyboard, and a manual insert switch to inform said electronic device that the data that has been received is valid data.

4. The system claimed in claim 1 wherein said amplifying means for amplifying is an operational amplifier.

5. The system claimed in claim 1 wheein said transmitter means for producing and transmitting is a voltage controlled oscillator.

6. The system claimed in claim 1 wherein said receiver means is an F.M. receiver.

7. The system claimed in claim 1 wherein said means for supplying power is a battery.

8. The system claimed in claim 1 wherein first decoding means comprises:
   a. a first filter assembly for converting the radio frequency signals received from said receiving means into discrete output voltages;
   b. a first decimal to binary converter whose input is coupled to the output of said first filter assembly, said first decimal to binary converter changes its discrete voltage inputs into a binary output; and
   c. a first de-multiplexer whose input is coupled to the output of said first decimal to binary converter, said first de-multiplexer controls the routing of the information received from said first converter.

9. The system claimed in claim 1 wherein said timing means comprises:
   an envelope detector whose input is coupled to the output of said receiver means, said envelope detector rectifies the tone signals received from said receiver means and generates an output signal which is a pulse for each tone burst that said envelope detector receives.
   a nand gate one of whose two inputs is coupled to the output of said envelope detector,
   a counter that is incremented by the output of said nand gate, the output of said counter being coupled to the input of said decoding means,
   an inverter whose input is coupled to the output of said counter and whose output is coupled to the input of said nand gate, and
   a plurality of nand gates, the inputs of each of said plurality of nand gates being coupled to a different output count of said counter and the output of each of said plurality of nand gates being coupled to a different load input of said plurality of registers so that certain information may be entered into each of said plurality of registers upon the enabling of each of said plurality of nand gates.

10. The system claimed in claim 1 further including means for automatically entering information into said remote controlled wireless transmitter receiver system.

11. The system claimed in claim 10 wherein said means for automatically entering comprises:
    a second timing means coupled to said source of power,
    a plurality of thumbwheel switches coupled to said multi tone generator and said timing means for selecting the information to be entered into said electronic system,
    a first diode and a second diode the input of said first and second diodes being connected to the input of said multi tone generator and the output of said first and second diodes being connected to said timing means so that said multi tone generator will transmit the information selected by said thumbwheel switches in response to said second timing means.

12. The system claimed in claim 11 wherein said second timing means comprises:
    a. a clock whose input is coupled to said means for supplying power, said clock outputs a serial stream of pulses that are equal time periods apart;
    b. a second counter whose input is coupled to the output of said clock, said second counter being incremented by the output of said clock; 'c. a second plurality of nand gates, the inputs of each of said plurality of nand gates being coupled to a different output count of said second counter, and the ouput of said second plurality of nand gates being coupled to a different contact of said plurality of thumbwheel switches, whereby when one of said plurality of nand gates are enabled the information selected on one of said plurality of thumbwheel switches will be processed by this system.

13. A system claimed in claim 1 further including:
    means for communicating coupled to said electronic device so that said communicating means may transmit information in the form of frequency modulated radio frequency signals to the electronic equipment contained within said portable housing,
    receiving means at the location of said electronic device for receiving the radio frequency output of said transmitter means within said portable housing,
    a filter assembly whose input is coupled to the output of said receiving means, said filter assembly converts the radio frequency signals received from said means for receiving into discrete output voltages,
    a decimal to binary converter whose input is coupled to the output of said filter assembly, said decimal to binary converter changes its discrete voltage inputs into a binary output, a de-multiplexer whose input is coupled to the output of said decimal to binary converter, said de-multiplexer controls the routing of the information received from said decimal to binary converter, a second plurality of registers for temporarily storing the information received from said de-multiplexer, the input of said second plurality of registers being connected to the output of said de-multiplexer, the input of said computing device being coupled to the output of said second plurality of registers, and a second timing means whose input is coupled to the output of said receiving means and said filter assembly and whose output is coupled to the load input of said second plurality of registers, whereby at the proper time sequence the information transmitted by said communicating means is displayed on said means to verify said information on said portable housing.

14. The system claimed in claim 13 wherein said displaying means for verifying information on said portable housing comprises:

a decoding and display driver that changes the binary output received from said first plurality of registers and produces a decimal output, and a plurality of light emitting diodes whose input is coupled to the output of said decoding and display driver.

15. The system claimed in claim 13 wherein said receiving means is a F.M. receiver.

16. The system claimed in claim 13 wherein said communicating means comprises:

a second multi tone generator that outputs different radio frequency signals for different information that it receives, a second means for amplifying and converting the radio frequency output of said second multi tone generator into voltages, the input of said amplifying means being coupled to the output of said multi tone generator, and a second means for transmitting a radio frequency output, said second transmitting means being coupled to the output of said second means for amplifying.

17. The system claimed in claim 16 wherein said second means for amplifying is an operational amplifier.

18. The system claimed in claim 16 wherein said second means for transmitting is a voltage controlled oscillator.

19. The system claimed in claim 13 wherein said second timing means comprises:

an envelope detector whose input is coupled to the output of said receiving mens, said envelope detector rectifies the tone signal received from said receiving means and generates an output signal which is a pulse for each tone burst that said envelope detector receives, a nand gate, one of whose two inputs is coupled to the output of said envelope detector, a counter that is incremented by the output of said nand gate, the output of said counter being coupled to the input of said de-multiplexer, an inverter whose input is coupled to the output of said counter and whose output is coupled to the input of said nand gate, and a plurality of nand gates the inputs of each of said plurality of nand gates being coupled to a different output count of said counter and the output of each of said plurality of nand gates being coupled to a different load input of said second plurality of registers so that certain information may be entered into each of said second plurality of registers upon the enabling of each of said plurality of nand gates.

* * * * *